Patented Apr. 10, 1928.

1,665,237

UNITED STATES PATENT OFFICE.

JOHN P. TRICKEY, OF EVANSTON, AND CARL S. MINER, OF CHICAGO, ILLINOIS, ASSIGNORS TO THE QUAKER OATS COMPANY, OF CHICAGO, ILLINOIS, A CORPORATION OF NEW JERSEY.

COMPOUND RESINOUS SUBSTANCE AND PROCESS OF MAKING SAME.

No Drawing. Application filed August 23, 1924, Serial No. 733,762. Renewed February 27, 1928.

This invention pertains to newly discovered resinous substances and relates more particularly to products that we have obtained from alcoholic furane derivatives and aldehydic furane derivations, and to methods of making such products.

Furfuralcohol, furfural and other furane derivatives have heretofore been resinified and the resulting products possess properties which are satisfactory and commercially useful for many purposes. Resinification of these materials may be caused to take place by the use of heat or catalysis or both. Under carefully controlled conditions the formation of certain of these resins may be gradual, the products being first semi-liquid and as the reactions proceed viscous and plastic resinous substances result, the consistency of which depends upon the extent to which the reaction has proceeded. Finally, if the reactions proceed to a conclusion, substantially infusible, insoluble, solid, resinous products are obtainable. We have found that the resinification of furfuralcohol particularly may be readily controlled and that intermediate resinous products of various degrees of consistency may be produced from this particular furane derivative without difficulty by our processes. Accordingly, the furfuralcohol resins are especially desirable commercially in that their several forms in various degrees of consistency are adaptable to many uses and may be readily mixed with other compounds or fillers. The tacky and plastic properties of the furfuralcohol resins in their intermediate stages also render them commercially desirable.

In this invention, it is one of our objects, therefore, to provide a relatively inexpensive resin having desirable properties similar to those of furfuralcohol resin. Furthermore, it is our aim to provide a wider field of use to other resinous products of furane derivatives, particularly the resinous products of furfural, by imparting thereto many of the desirable characteristics of the furfuralcohol resin.

The invention embodies the discovery of a new type of compound resinous substances which we have found to possess many of the desirable properties above referred to. The compound resin embodying our invention is comparatively cheap to produce and under most conditions in its intermediate stages it is very plastic and hence may be easily worked and mixed with filler materials.

Heretofore, the formation of desirable resins from furfural has been somewhat difficult to control, since rubbery substances which are difficult to mix with filler materials tend to immediately form without the gradual formation of the desirable plastic intermediate products. Hence, a further object of our invention is to provide a process for making a resin embodying the use of furfural, the process being such that the resinification may be controlled to take place gradually, thus permitting the formation of resins of various degrees of consistency ranging from semi-liquid, syrupy substances to the thick plastic forms, which are relatively stable.

Furthermore, it is the purpose of this invention to provide rapid, inexpensive and efficient processes for making resinous materials having the above described properties in a high degree of purity and with carefully controlled compositions.

We have found that resins having various properties may be obtained by resinifying a mixture or solution of a plurality of furane derivatives. For example, furfuralcohol may be dissolved in furfural and thereupon both the alcohol and aldehyde may be resinified by catalysis, or by heating, or both. A comparatively inexpensive and plastic resin may be formed by dissolving a quantity of the furfuralcohol in an equal quantity of furfural, and thereupon a quantity of hydrochloric acid equal to one-tenth of one percent by weight of the solution may be added while heating the solution to a temperature approximating 80° C. The acid serves as a catalyst and brings about various reactions resulting in resinification of both the alcohol and furfural. The speed and extent to which the action then proceeds may be largely controlled as desired by properly regulating the temperature. The reaction being somewhat exothermic in character will proceed of itself after the mixture is heated to approximately 80° C. In treating large volumes of the mixture, as soon as the reaction starts, we preferably control the temperature by applications of a cooling medium. We have found it desirable to main tain the temperature at about 110° C. or less.

This may be done by the use of refrigerating coils within or around the container.

Another convenient way of producing this compound resinous material under easily regulated conditions of temperature is to heat the furfuralcohol-aldehyde mixture or solution with a quantity of water. For example, 250 grams of furfuralcohol and 250 grams of furfural may be mixed with 750 grams of water containing about 5 grams of hydrochloric acid and heated with constant agitation. When the temperature of this mixture rises to 80° C., the compound resin begins to form. When the reaction has proceeded to a point where resin of the desired consistency is obtained the water may be separated and the catalyst may be washed from the resin, preferably with a very weak alkaline solution. Extremely viscous, tacky but relatively stable resins may be obtained by this process.

With certain catalysts the process may be efficiently and rapidly carried out by heating the reaction mixture under pressure to temperatures above the atmospheric boiling point of the furane derivatives.

Aside from the control of the reaction by regulation of the temperature, we have found that the speed and extent of the reaction may be controlled by varying the percentage of catalyst present. For example, by adding one percent of the hydrochloric acid the reaction will immediately be manifested by producing a blackening of the mixture. However, the reaction is usually most readily controlled with weak acids. The speed of the reaction may be also checked by neutralization, by dilution with an inert liquid, or by removal of the catalyst.

Another satisfactory method of forming compound resins of furane derivatives is to first form fulfuralcohol resins by any suitable process. The furfuralcohol resin may be dissolved in a substantially equal quantity by weight of furfural, whereupon the solution may be merely heated to form the compound resin, the alcoholic resin apparently having a catalytic effect in bringing about resinification of the furfural. The viscous, tacky properties of furfuralcohol resin may thus be effectively imparted to the cheaper furfural resin at small expense.

The combined furfuralcohol and furfural resins may also be formed by a process by which pyromucic acid is also produced. By such a process approximately 192 parts by weight of furfural may be caused to react with 27 parts of sodium hydroxide which is preferably added in a solution of a strength such that 14 pounds of the solution will contain 4 pounds of sodium hydroxide. This reaction mixture should be kept at a low temperature approximating 15° C. until the reaction is completed. It has been found that under these conditions, furfuralcohol and a sodium salt of pyromucic acid are formed as a result of a chemical reaction involving simultaneous oxidation and reduction. The above quantity of sodium hydroxide is insufficient to react with all of the furfural. A portion of the furfural accordingly will remain in the mixture after the sodium hydroxide has entirely reacted.

By means of our process we transform the remaining furfural and the furfuralcohol which has been formed, into a compound resin and simultaneously transform the salt of pyromucic acid into free pyromucic acid. To accomplish these results we add to the mixture a quantity of acid, preferably mineral acid, such as 33⅓% sulphuric acid solution until the mixture is slightly acid to Congo red. Under these conditions, free pyromucic acid will be liberated. At the same time, considerable quantities of the salt of the mineral acid will be formed and if the particular chemicals above cited are used, this will be a sodium salt of sulphuric acid, the greater part of which will precipitate at this point. A small quantity of the pyromucic acid which is produced will also precipitate at this point. These precipitates may now be separated from the mixture as by filtering and washing. Up to this time the mixture may be kept at a low temperature.

At this point the resulting mixture contains in the solution considerable quantities of pyromucic acid, furfural and furfuralcohol, and also contains a small amount of the mineral acid which has been added in quantities slightly in excess of the amount necessary to recover all of the pyromucic acid from its sodium salt. The exact quantity of furfural contained in the mixture may be fixed by controlling the proportion of sodium hydroxide initially added in order that a compound resin of the desired composition may be later produced. In order to resinify the alcohol and furfural, the mixture may now be heated to a temperature approximating 80° C. As a result of the catalytic effect of the mineral acid present accompanied by heating, the furfuralcohol and furfural undergo reactions which if carried sufficiently far, result in complete resinification. The speed and extent of this resinification may be controlled within wide limits by varying the temperature and the amount of mineral acid present, as in the processes previously described.

After this resinification process has proceeded to the desired extent or when a resin of the desired consistency has been obtained, the resin may be separated from the liquid mixture and then purified. It will be noted that by this process very efficient use is made of all of the materials involved.

With all of the above processes in the initial stages of the resinification, the mixtures take on a darker or blackening appearance. As the reactions proceed, substances in the nature of resins are formed. These substances are liquid at temperatures around 110° C. but upon cooling they become thick and viscous substances which are soluble in acetone or other solvents but are substantially insoluble in water. If the reactions are allowed to proceed as by further heating or by permitting the exothermic reaction to proceed, solid resinous bodies which soften upon heating are obtainable. When the actions proceed to a conclusion substantially infusible, insoluble resins are obtainable.

Throughout this application we have employed the term "alcoholic furane derivatives," "aldehydic furane derivatives" and "furane derivatives." It is to be understood, however, that by these terms are meant chemical compounds containing no other ring nucleus except the furane ring as distinguished from furane compounds which are chemical compounds containing another ring nucleus or other ring nuclei besides the furane ring.

It will be understood that various changes and substitutes of equivalents may be made without departing from the scope and principle of the invention set forth in the appended claims.

Having thus described our invention, what we claim as new and desire to secure by Letters Patent of the United States, is:

1. The compound resin resulting from the resinification of an alcholic furane derivative with its corresponding aldehyde by the action of catalysis.

2. A compound resinous reaction product formed from an alcoholic furane derivative and furfural, both being in solution.

3. The compound fusible soluble resin formed from a plurality of furane derivatives that severally and of themselves are capable of producing resinous reaction products one of which has the property of reducing the rubbery characteristic of the resinous reaction product resulting from another furane derivative.

4. The compound resinous reaction product of a mixture of an alcoholic furane derivative and an aldehydic furane derivative.

5. The compound resinous reaction product of furfuralcohol and an aldehydic furane derivative.

6. The compound resinous reaction product of furfural and an alcoholic furane derivative.

7. The compound resin resulting from the resinification of furfuralcohol with furfural by the action of catalysis.

8. The compound resinous reaction product of furfuralcohol and furfural.

9. A fusible soluble furfural-furfuralcohol resin that is transformable to a substantially infusible insoluble material.

10. A compound viscous resin formed from furfural and furfuralcohol and which is soluble in organic solvents but substantially insoluble in water.

11. A compound fusible soluble resin resulting from heating a mixture of furfural and furfuralcohol in the presence of a catalyst.

12. The method of overcoming rubbery non-plastic properties of a furfural resin which comprises associating furfuralcohol resin therewith.

13. The process of obtaining a compound resinous material which comprises heating furfuralcohol with furfural in the presence of a catalyst.

14. The process of obtaining a compound resin which comprises subjecting alcoholic and aldehydic furane derivatives in solution to catalysis.

15. The process of obtaining a compound resinous material which comprises heating furfuralcohol with furfural in the presence of a small amount of acid.

16. The process of obtaining a compound resinous material which comprises heating furfuralcohol with furfural in the presence of a small amount of mineral acid.

17. The process of obtaining a compound resin which comprises subjecting a solution of a plurality of furane derivatives to catalysis, said furane derivatives severally and of themselves being capable of producing by themselves dissimilar resinous reaction products.

18. The process of obtaining a compound resin which comprises mixing furfural with a quantity of an alkali insufficient to convert all the furfural into furfuralcohol and a salt of pyromucic acid, causing the mixture to react to form a mixture of furfural, furfuralcohol and a salt of pyromucic acid, and then adding a quantity of an acid sufficient to cause liberation of substantially all of the pyromucic acid and to cause resinification of the furfural and furfuralcohol.

19. The compound resin formed from a reaction mixture which result from reacting furfural with a quantity of an alkali insufficient to convert all of the furfural into furfuralcohol and a salt of pyromucic acid, adding a quantity of an acid sufficient to cause liberation of substantially all of the pyromucic acid and to cause resinification of the furfural and furfuralcohol to form the compound resin.

In witness whereof, we have hereunto subscribed our names.

JOHN P. TRICKEY.
CARL S. MINER.